United States Patent Office 2,993,629
Patented July 25, 1961

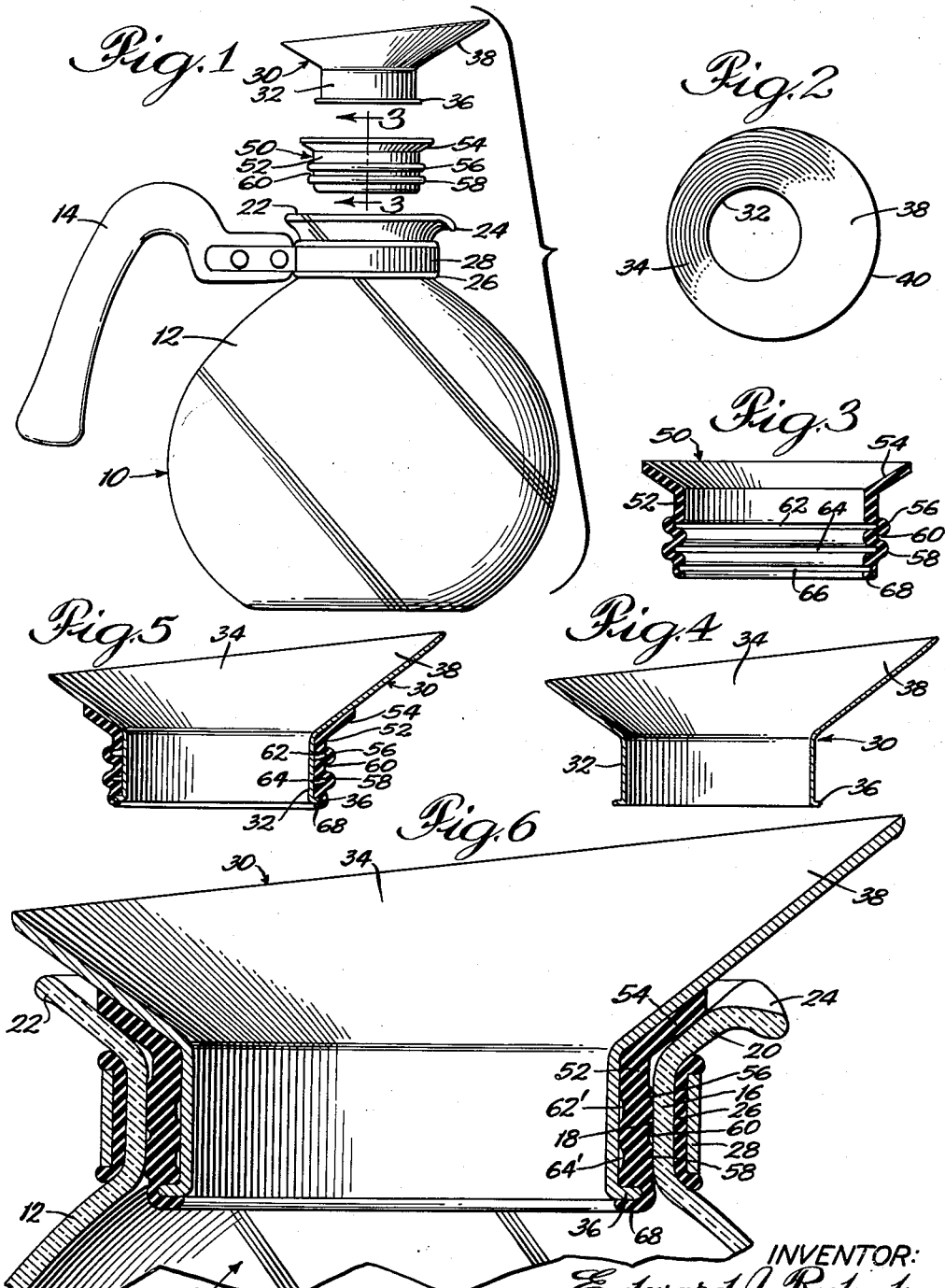

2,993,629
DETACHABLE POURING SPOUT AND GASKET ASSEMBLY FOR COFFEE MAKER BOWL
Edward J. Ruhnke, Chicago, Ill., assignor to Hill-Shaw Company, Chicago, Ill., a corporation of Illinois
Filed Aug. 7, 1957, Ser. No. 676,862
6 Claims. (Cl. 222—542)

This invention relates generally to a coffee maker bowl or liquids server, and more particularly to a novel pouring spout attachment for the bottom bowl of a vacuum-type coffee maker construction.

The bottom bowls of vacuum-type coffee makers and similar liquids servers are conventionally formed of heat resistant glass or like materials, and are provided with a supporting handle assembly for manipulation of the bowl or container during pouring and dispensing of coffee or other liquids therefrom. Although the mouths of such bowls have been formed in the past with integral pouring lips, it has not been possible to provide a form for such lips which completely precludes dripping and spillage during normal pouring operations, and which is substantially unbreakable in normal use.

Although a non-drip pouring spout can be formed of metal and other materials of construction which permit a sharp-edged and particularly contoured pouring lip which is not subject to the problems of dripping and breakage, it has not been possible in the past to provide a separate pouring spout attachment which is readily removable for cleaning and replacement purposes while being universally adapted for use with bowls having a wide range of dimensional tolerances. It is the practice of the manufacturers of glass coffee maker bowls to produce such bowls in accordance with strictly maintained tolerances for the form and dimensions of the bowl mouth. Such tolerances are assigned to the particular bowl design supplied by the bowl manufacturer to its customer manufacturer of complete coffee maker assemblies. The manufacturing tolerances inherent in the glassmaking art necessarily requires a range of dimensional values for the size of the bowl mouth. In practice the openings of such containers will vary within a tolerance range of about 9/64".

At the present time heat-resistant coffee maker bowls and the like liquids serving containers are formed with a mouth having a generally circular internal wall which provides a flat annular surface of substantial vertical height, but which may be slightly inwardly convex under certain conditions of manufacture. The diameter of the mouths of such containers will vary within a known range, and the bowls of each particular manufacturer will be characterized by a predetermined range of mouth diameter sizes.

It is a primary object of this invention, therefore, to provide, in combination with an open-mouth container of the type which may vary substantially in mouth dimensions over a given range of values, a detachable non-drip pouring spout assembly to protect the container mouth and minimize risk of breakage, wherein the spout assembly is characterized by its adaptability to a range of container mouth dimensions, by its capability of effecting a completely fluid-tight sealing cooperation with such containers, and by its ease of removability for cleaning and replacement purposes.

It is another object of this invention to provide a pouring spout attachment for an open-mouth container comprising a metal pouring lip and a gasket ring, wherein the gasket ring is uniquely formed and shaped to provide a novel cooperative sealing relationship with the container mouth.

It is a further object of this invention to provide a novel sealing gasket of resilient material characterized by external protuberances or convolutions adapted to maintain full line contact with a surrounding annular wall surface, and further characterized by internal grooves for effecting mass distribution of the gasket material during sealing engagement.

With these and other objects, in view, my invention consists in the construction, arrangement, and combination of the various parts of my device whereby the objects contemplated are attained, as hereinafter more fully set forth, pointed out in my claims and illustrated in the accompanying drawings, wherein:

FIGURE 1 is an exploded view in side elevation showing the component parts of the present invention, comprising a glass coffee maker bowl, a resilient gasket, and a pouring spout for detachable cooperation with the bowl;

FIGURE 2 is a top plan view of the pouring spout shown in FIGURE 1;

FIGURE 3 is a vertical cross-sectional view of the resilient gasket shown in FIGURE 1;

FIGURE 4 is a vertical cross-sectional view of the pouring spout of FIGURES 1 and 2;

FIGURE 5 is a vertical cross-sectional view, similar to FIGURE 4, showing the resilient gasket of FIGURE 3 in cooperative assembly with the pouring spout; and FIGURE 6 is a further vertical cross-sectional view, on a substantially enlarged scale, showing the pouring spout and its gasket in cooperative sealing assembly within the mouth of the coffee maker bowl.

Referring now more particularly to the drawing, I have indicated generally at 10 a conventional bottom bowl assembly of the type employed in vacuum coffee maker constructions, and comprising a glass bowl 12 formed of heat resistant glass or the like, and a separate insulated handle 14 for manual support of the bowl. The bowl 12 provides a generally globular geometry, formed as nearly spherical as possible for maximum strength characteristics. The bowl has a flat bottom wall for surface support and an inwardly converging top wall terminating in a restricted neck portion 16. The neck portion 16 is substantially cylindrical in form, and defines an open mouth for the bowl having a substantially flat inner annular surface 18. The surface 18 is of substantial vertical height, generally about 3/8", and terminates upwardly in an outwardly flaring portion 20 having a beaded edge 22 which is formed at one portion of its periphery in a downwardly extending pouring flute 24. The handle 14 is externally secured to the bowl neck portion 16 by means of a resilient cushion ring 26 and a metal clamping ring 28. The particular details of construction of the bowl 12 and the means for attachment of the handle 14 are conventional and well known.

The contribution of the present invention is particularly directed to a normal pouring spout assembly adapted to be detachably secured in liquid-tight relation within the bowl mouth defined by the wall surface 18. Since the diameter, height, and either flatness or inward convexity of the bowl neck 16 and wall surface 18 will vary substantially between bowls, I have found it necessary to device a unique gasket means for securing a non-drip type of pouring spout to the bowl in liquid-tight but readily removable manner. The present invention is directed to such a novel gasket and its cooperative combination with a rigid pouring spout and a fragile bowl.

I provide a metal pouring spout, indicated generally at 30, having a generally cylindrical neck 32 and an upper outwardly flared lip portion 34. It will be understood that the spout 30 may also be made of plastic or like rigid materials of construction. The bottom edge of the neck 32 is outwardly bent to provide a lower annular rim 36. The lip portion 34 is laterally enlarged to one side at 38 and terminates in an inclined edge 40 which is dimensionally characterized by sufficient "sharpness" so as to permit liquid pouring thereover in a manner which will not result in dripping when the pouring operation is interrupted or terminated.

I have indicated generally at 50 a gasket embodying the novel principles and features of the present invention. The gasket 50 is formed of a suitable resilient material, such as natural or synthetic rubber, and is in the form of a continuously integral annular ring. The particular form and shape of the gasket 50 constitute a critical and essential aspect of this invention. The gasket 50 provides a generally circular cylindrical main body portion 52. The body 52 is upwardly and outwardly flared at 54 to define an upper end skirt of generally frusto-conical form. The angle of flare of the portion 54 is predetermined so as to be substantially identical with the angle of flare of the lip portion 34 of the cooperating metal pouring spout 30. In this way, the inner wall surface of the gasket skirt 54 will be adapted to nestingly engage against the outer wall surface of the spout lip 34.

The lower portion of the gasket body 52 serves to define at least two outwardly extending annular convolutions 56 and 58. A separating groove 60 is defined between the convolutions 56 and 58. If the body 52 is viewed as a uniform straight cylinder of substantially constant wall thickness, the convolutions 56 and 58 are, in effect, annular protuberances extending outwardly from the outer wall surface of the body 52, as best seen in FIGURE 3 of the drawing.

The inner wall surface of the gasket body 52 is particularly formed with at least a pair of internal annular grooves 62 and 64. The grooves 62 and 64 lie in substantially the same planes as and within the vertical height of the convolutions or protuberances 56 and 58 respectively. The grooves 62 and 64 may be viewed as extending into the uniform cylindrical wall surface of the gasket body 52, in a manner corresponding to a view of the convolutions 56 and 58 as being protuberances. It will be understood that an internal groove must be provided for each external convolution, for a purpose which will be more fully described hereinafter.

The bottom end of the gasket body 52 is inwardly annularly grooved at 66 so as to define an in-turned bottom lip 68.

The minimum internal wall diameter of the gasket 52 is selected so as to be slightly less than the maximum external diameter of the pouring spout neck 32. In practical manufacture, the gasket 50 will be a molded item having uniformly constant dimensional characteristics, and the pouring spout 30 will be a metal stamping also characterized by uniform dimensional tolerances. In this way, the dimensions of the two parts will insure a slight stretch fitting of the gasket 50 in surrounding relation about the pouring spout 30. When thus assembled as in FIGURE 5, the gasket 50 will maintain substantially the same form and contour as in its unstressed state of FIGURE 3. The upper skirt 54 will tightly nest against the spout wall 34, and the lower lip 68 will surroundingly cooperate with the spout rim 36 which is adapted to be received within the groove 66 of the gasket. In this way, all metal surfaces of the pouring spout 30 will be cushioningly covered by the resilient material of the gasket 50 so as to preclude metal-to-glass engagement when the spout 30 is inserted within the mouth of the bowl 12.

Referring now more particularly to FIGURE 6 of the drawing, the practical operation and utility of the present invention will be more particularly described. Assuming that coffee has been made in a vacuum-type coffee maker of the type having an upper and lower bowl combination, and the upper bowl and its dip stem have been removed from inserted cooperation with the lower bowl, a quantity of brewed coffee may then be poured or dispensed as desired from the lower bowl. It is quite customary practice to place a bowl of brewed coffee on a hot plate or other heating device for the purpose of keeping the coffee warm during intermittent dispensing over a period of time. This is particularly true in restaurants, offices, and public gathering places. Because of the frequent pourings which occur, it is particularly desirable to provide some form of drip-free pouring means. The metal pouring spout and resilient gasket combination of the present invention is particularly intended for this purpose. The assembly as seen in FIGURE 5 need only be slightly moistened about the external surface of the gasket 50 and then inserted within the open mouth defined by the inner wall surface 18 of the bowl 12. As has already been described, the bowl 12 may be of any source of current manufacture.

When the pouring spout assembly is inserted within the bowl mouth, the outer protuberances 56 and 58 will be compressed and confined by the bowl wall surface 18. The maximum external dimension or diameter of the protuberances 56 and 58 is selected so as to be somewhat greater than the maximum bowl mouth diameter of known commercial coffee maker bowls. At the present time, an external protuberance diameter in excess of 1.92″ will be satisfactory for all commercial bowls, whose inside mouth diameters range from 1.79″ to 1.92″. The height or spacing between the protuberances is selected so as to be somewhat less than the flat inner wall height 18 of commercial bowls, or about 3/16″.

As is well known, resilient materials such as rubber and the like are characterized by the inherent physical property of incompressibility. That is, the exertion of a pressure of force against one surface portion of a solid rubber article will result in a shift or movement of the rubber material to effect its "relief" deformation and permit a mass of material at the surface engaged to move outwardly in expansion at some other surface portion of the article. In this regard, the movement of the rubber is analogous to that of a liquid. Although the rubber article may be deformed by the exertion of confining forces against its surfaces, its total volume will remain constant. Because of this characteristic of rubber, and because of its numerous additional physical properties which ideally suit it to use as a gasket material, it is a critically important feature of the present invention to provide the internal grooves 62 and 64.

It will be understood that as the external convolutions 56 and 58 are "compressed" or deformed, there will be a shift of the deformed portions of the gasket into the open spaces or air gaps provided by the grooves 62 and 64. In this way the relatively great dimensional thickness between the outermost portions of the convolutions 56 and 58 and the innermost wall surface of the body 52 will be greatly reduced, as clearly seen in FIGURE 6. The resilient mass which defined the protuberances externally of the gasket will be deformably shifted or moved so as to substantially fill the grooves or voids at the inner wall surface thereof. Where the internal mouth dimension of the coffee bowl is quite small, the extent of deformation of the gasket will be a maximum, and the convolutions and grooves thereof will be substantially deformed into a shape closely approximating a straight walled cylinder.

It will be apparent that this combination of external protuberances and internal grooves directly inwardly thereof permits a compression of the gasket in a manner which effectively insures full annular contacting engagement between the gasket convolutions 56 and 58 and the inner wall surface 18 of the bowl mouth. The gasket of the present invention serves to effect a liquid-tight seal under virtually all conditions because of the ability of the protuberances to effect continuous and unbroken line contact with the bowl mouth wall 18. By providing at least a pair of such protuberances, it is possible to effect double line contact, thereby providing an effective seal which is equivalent to complete surface contact over the full height distance between the planes of the two lines of contact. Further, since each protuberance is able to deform independently of its adjacent protuberance across the groove 60, and to assume a line of contact characterized only by the immediate surrounding geometry of the bowl mouth wall 18, the gasket 50 is capable of readily adapting to wide tolerance variations which may exist in the glass bowl neck. Although modern glass blowing techniques permit a relatively narrow range of tolerances to be maintained, such diameter variations, convexities, and surface irregularities as do occur in commercial bowl constructions will be readily accommodated and compensated for by the gasket of the present invention.

The upper skirt 54 of the gasket 50 serves not only as a cushion for the metal pouring spout 30 and the bowl lip 20, but also provides a positioning means to prevent upward "creep" of the gasket as the assembly is forcibly inserted into a bowl mouth. The lower rim 68 also assists in this same purpose, thereby insuring proper positioning of the gasket 50 in assembled relation with the metal pouring spout 30.

While there has been shown and described a particular detachable pouring spout and gasket assembly for a coffee maker bowl, it will be obvious to those skilled in the art that various changes and modifications may be made therein without departing from the invention, and, therefore, it is intended in the appended claims to cover all such changes and modifications as fall within the true spirit and scope of the invention.

What I claim as new and desire to secure by Letters Patent of the United States is:

1. A pouring spout and gasket assembly adapted for detachable and liquid-tight sealing insertion within the open mouth of a container, said assembly comprising a rigid pouring spout having an annular body portion, a radially outwardly extending annular rim on said spout at the normally lower end of said body portion, a resiliently deformable but incompressible gasket ring tightly surrounding said spout body portion, said ring having an annular protuberance at the outer wall surface thereof providing a resilient mass portion and having an annular groove of substantial lateral depth at the inner wall surface thereof lying entirely within the height dimension of said protuberance, whereby said protuberance may be compressed in continuous line contact with a surrounding container mouth by confining insertion therein, and the resilient mass portion of said protuberance deformably shifted radially inwardly by confining compression thereof will be received and distributed by a corresponding reduction of the depth of said groove, and means forming an annular groove in the inner wall surface of said ring at the normally lower end thereof adapted for receiving said rim therein.

2. A pouring spout and gasket assembly adapted for detachable and liquid-tight sealing insertion within the open mouth of a container, said assembly comprising a rigid pouring spout having an annular body portion, a radially outwardly extending annular rim on said spout at the normally lower end of said body portion, a resiliently deformable but incompressible gasket ring tightly surrounding said spout body portion, said ring having a plurality of spaced annular protuberances at the outer wall surface thereof each providing a resilient mass portion and having a corresponding plurality of annular grooves of substantial lateral depth at the inner wall surface thereof each lying substantially in the same plane as a corresponding one of said protuberances, whereby each of said protuberances may be compressed radially inwardly in continuous line contact with a surrounding container mouth by confining insertion therein, and the resilient mass portion of each protuberance deformably shifted radially inwardly by confining compression thereof will be received and distributed by a corresponding reduction of the depth of the respective coplanar one of said grooves, and means forming an annular groove in the inner wall surface of said ring at the normally lower end thereof adapted for receiving said rim therein.

3. In combination, an open mouth container and a pouring spout and gasket assembly sealingly inserted in detachable and liquid-tight relation within the open mouth of said container, the improvements therein characterized by a rigid annular pouring spout body, a radially outwardly extending annular rim on said body at the normally lower end thereof, a resiliently deformable but incompressible gasket ring tightly surrounding said spout body, said ring having an annular protuberance at the outer wall surface providing a resilient mass portion thereof and having an annular groove at the inner wall surface thereof lying substantially in the same plane as said protuberance, said protuberance being deformably compressed radially inwardly into continuous line contact with the surrounding container mouth, and said groove receiving the resilient mass portion of said protuberance deformably shifted radially inwardly by confining insertion of said spout and ring within the surrounding container mouth, and means forming an annular groove in the inner wall surface of said ring at the normally lower end thereof adapted for receiving said rim therein.

4. In combination, an open mouth container and a pouring spout and gasket assembly sealingly inserted in detachable and liquid-tight relation within the open mouth of said container, the improvements therein characterized by a rigid pouring spout having an upwardly and radially outwardly flared lip portion and an annular body portion therebelow, a radially outwardly extending annular rim on said spout at the normally lower end of said body portion, a resiliently deformable but incompressible gasket ring tightly surrounding said spout body, said ring having an annular protuberance at the outer wall surface thereof providing a resilient mass portion and having an internal annular groove at the inner wall surface thereof lying substantially in the same plane as said protuberance, said ring having an upwardly and radially outwardly flared skirt at the upper end thereof tightly engaging the lip portion of said spout, said protuberance being deformably compressed radially inwardly in continuous line contact with the surrounding container mouth, and said groove receiving the resilient mass portion of said protuberance deformably shifted radially inwardly by confining insertion of said spout and ring within the surrounding container mouth, and means forming an annular groove in the inner wall surface of said ring at the normally lower end thereof adapted for receiving said rim therein.

5. In combination, an open mouth container and a pouring spout and gasket assembly sealingly inserted in detachable and liquid-tight relation within the open mouth of said container, the improvements therein characterized by a rigid pouring spout having an upwardly and radially outwardly flared lip portion and an annular body portion therebelow, a radially outwardly extending annular rim on said spout at the normally lower end of said body portion, a resiliently deformable but incompressible gasket ring tightly surrounding said spout body, said ring having an annular protuberance at the outer wall surface thereof providing a resilient mass portion and having an internal annular groove at the inner wall surface thereof lying within the height dimension of said protuberance, said ring having an upwardly and radially outwardly flared skirt at the upper end thereof tightly engaging the lip portion of said spout, said protuberance being deformably compressed radially inwardly in continuous line contact with the surrounding container mouth, and said groove receiving the resilient mass portion of said protuberance deformably shifted radially inwardly by confining insertion of said spout and ring within the surrounding container mouth, and means forming an annular groove in the inner wall surface of said ring at the normally lower end thereof adapted for receiving said rim therein.

6. In combination, an open mouth container and a pouring spout and gasket assembly sealingly inserted in detachable and liquid-tight relation within the open mouth of said container, the improvements therein characterized by a rigid annular pouring spout body, a radially outwardly extending annular rim on said body at the normally lower end thereof, a resiliently deformable but incompressible gasket ring tightly surrounding said spout body, said ring having a plurality of spaced annular protuberances at the outer wall surface thereof each providing a resilient mass portion and having a corresponding plurality of annular grooves at the inner wall surface thereof each lying substantially in the same plane as a corresponding one of said protuberances, each of said protuberances being deformably compressed radially inwardly into continuous line contact with the surrounding container mouth, and the corresponding co-planar grooves receiving the respective resilient mass portions of said protuberances deformably shifted radially inwardly by confining insertion of said spout and ring within the surrounding container mouth, and means forming an annular groove in the inner wall surface of said ring at the normally lower end thereof adapted for receiving said rim therein.

References Cited in the file of this patent

UNITED STATES PATENTS

| | | |
|---|---|---|
| 2,265,615 | Statler | Dec. 9, 1941 |
| 2,396,491 | Chamberlin | Mar. 12, 1946 |
| 2,501,943 | Jack | Mar. 28, 1950 |
| 2,615,740 | Nathan | Oct. 28, 1952 |
| 2,621,831 | Smith | Dec. 16, 1952 |
| 2,698,113 | Linton | Dec. 28, 1954 |
| 2,802,609 | Donovan | Aug. 13, 1957 |

FOREIGN PATENTS

| | | |
|---|---|---|
| 271,338 | Switzerland | Jan. 16, 1951 |